(12) United States Patent
Ahmed (10) Patent No.: US 9,483,742 B1
(45) Date of Patent: Nov. 1, 2016

(54) INTELLIGENT TRAFFIC ANALYSIS TO DETECT MALICIOUS ACTIVITY

(71) Applicant: Amazon Technologies, Inc., Seattle, WA (US)

(72) Inventor: Khaja Ehteshamuddin Ahmed, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 14/524,376

(22) Filed: Oct. 27, 2014

(51) Int. Cl.
*G06N 99/00* (2010.01)
*H04L 29/06* (2006.01)

(52) U.S. Cl.
CPC ......... *G06N 99/005* (2013.01); *H04L 63/1441* (2013.01)

(58) Field of Classification Search
CPC .......................... G06N 99/005; H04L 63/1441
See application file for complete search history.

(56) References Cited

U.S. PATENT DOCUMENTS

| | | | | |
|---|---|---|---|---|
| 2003/0065926 A1* | 4/2003 | Schultz | ................. | G06F 21/562 713/188 |
| 2007/0192863 A1* | 8/2007 | Kapoor | .................. | G06F 9/505 726/23 |
| 2007/0239999 A1* | 10/2007 | Honig | ................... | G06F 21/554 713/194 |
| 2009/0320138 A1* | 12/2009 | Keanini | ............. | H04L 63/1416 726/25 |
| 2012/0278890 A1* | 11/2012 | Maatta | ................ | H04L 63/1425 726/23 |
| 2014/0283052 A1* | 9/2014 | Jordan | .................. | G06F 21/562 726/23 |

OTHER PUBLICATIONS

Shafiq et al., Extended thymus action for improving response of AIS based NID system against malicious traffic, Sep. 2007, IEEE Congress on Evolutionary Computation, pp. 3369-3376.*

* cited by examiner

*Primary Examiner* — Kenneth Chang
(74) *Attorney, Agent, or Firm* — Baker & Hostetler LLP (57) ABSTRACT

Techniques comprise identifying and/or classifying malicious activity in a web services platform using machine learning techniques. Systems, methods, and computer readable mediums may cause one or more computing nodes to monitor first network traffic, generate network information based on the monitored first network traffic, train a machine learning algorithm based on at least a first portion of the generated network information, test the machine learning algorithm based on at least a second portion of the generated network information, generate a predictor using the trained and tested machine learning algorithm, and identify second network traffic as one or more of malicious activity and benign activity using the predictor.

20 Claims, 7 Drawing Sheets

INTELLIGENT TRAFFIC ANALYSIS TO DETECT MALICIOUS ACTIVITY

BACKGROUND

Various computing devices are accessible over public communication networks, such as the Internet. While such access provides numerous opportunities to organizations utilizing such networks, it also presents substantial risk. For example, malicious activity such as distributed denial-of-service (DDoS) attacks has become a common way of utilizing distributed computing resources, often under unauthorized control, to overload the capacity of organizations' systems. A DDoS attack may, for example, include a collective group of computers, which may be located in various geographic locations, submitting multiple requests to a web or other server (or collection of servers) in order to utilize the server(s) capacity, thereby preventing the server(s) from responding to legitimate requests in a timely manner, if at all. For many organizations, such as organizations utilizing the Internet to interact with and/or otherwise service customers, preventing servers from responding to legitimate requests can cause significant harm to costs, revenue, customer goodwill, and in other ways. Not only is a DDoS victim prevented from servicing customers, but it may also be responsible for costs to Internet service providers (ISPs) for the increased network traffic attributable to DDoS attacks.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

By looking at statistics (or 'features' as they are called in machine learning) of network traffic flows, it is possible to classify such network traffic flows as being malicious. As an example, clustering and multi-class classification can be applied to the network traffic flows. As a further example, for every 5 tuple (i.e. Source IP, Source Port, Destination IP, Destination Port, and Protocol) the following statistics may uniquely identify the nature of the communication: average packet size in each direction, average time gap between packets, ratio of inbound to outbound packets, transmission control protocol (TCP) flag ratio, flag count, number of source/destination ports, ratio of inbound to outbound bytes, and type of protocol used. Such statistics may relate to various communication mechanisms such as web browsing, email, voice over Internet Protocol (VoIP), streaming video, application layer to database communication, database server to storage fabric communication, a slowloris attack, a SYN-flood, secure shell (SSH) password brute-forcing, a low rate denial of service (LDoS), etc. Additionally, heuristics may also be implemented to classify individual packets or streams as potentially being a DoS attack. Such heuristics may comprise identifying a spike in network traffic, a stream of packets that are the same size, malformed packets, TCP headers that contain both a SYN and a RST, a very large Internet Control Message Protocol (ICMP) request (e.g., larger than 64 kilobytes), an, sensitivity of destination IPs (e.g., frequency of being attacked), and/or a variety of other factors (e.g., both in the data plane or outside the data plane). Collecting a sample of statistics can lead to positive identification of the traffic/instance as malicious or not (e.g., benign). For example, a collection (e.g., library) of fingerprints for various types of traffic may be generated and traffic may be compared against the library to identify malicious activity. As a further example, malicious activity such as theft of information, data exfiltration, data extrusion, and the like may be detected based upon the collection of fingerprints.

Figure 1:
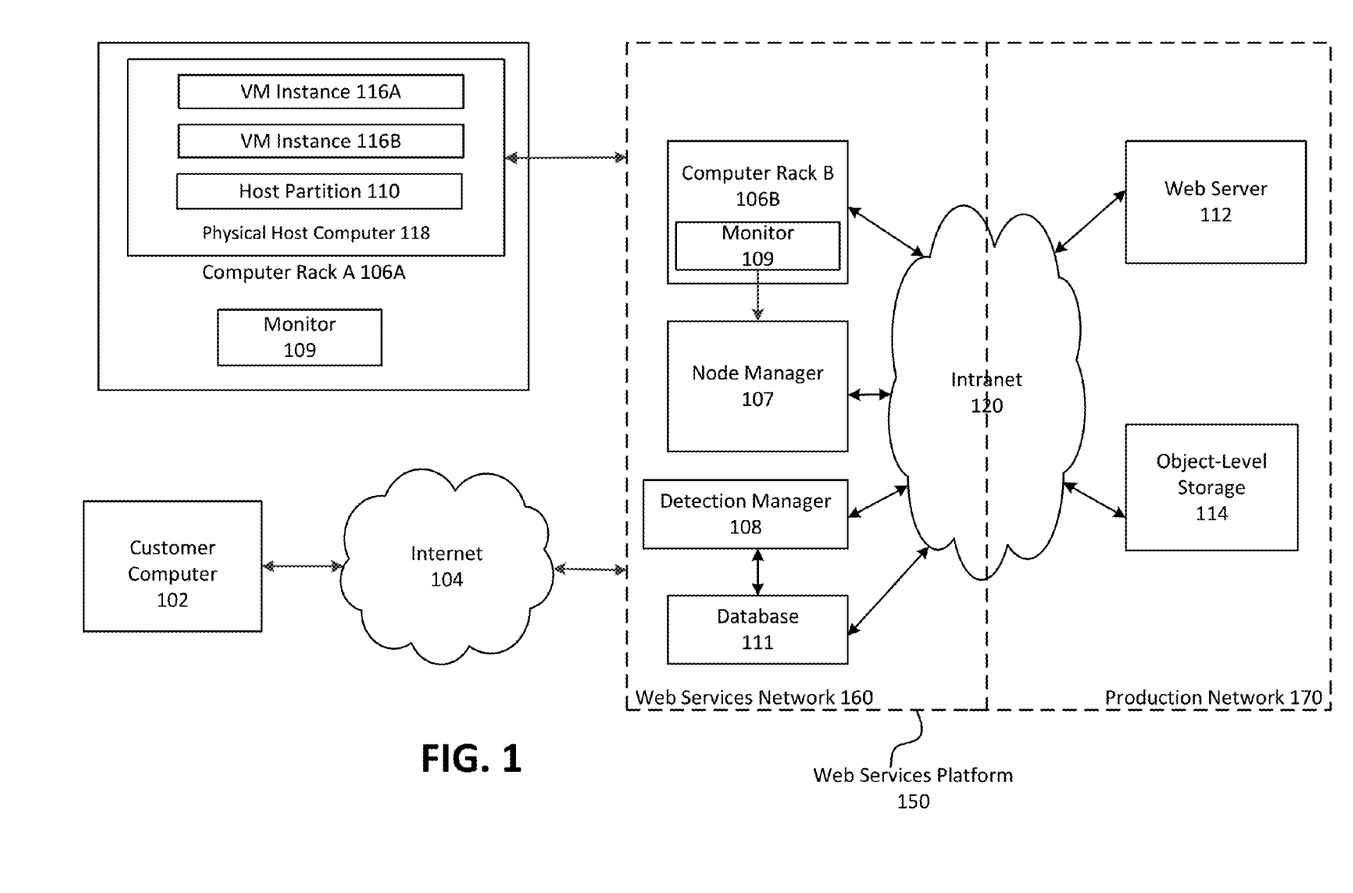
FIG. 1 depicts an example operating environment in which embodiments may be implemented.
Figure 2:
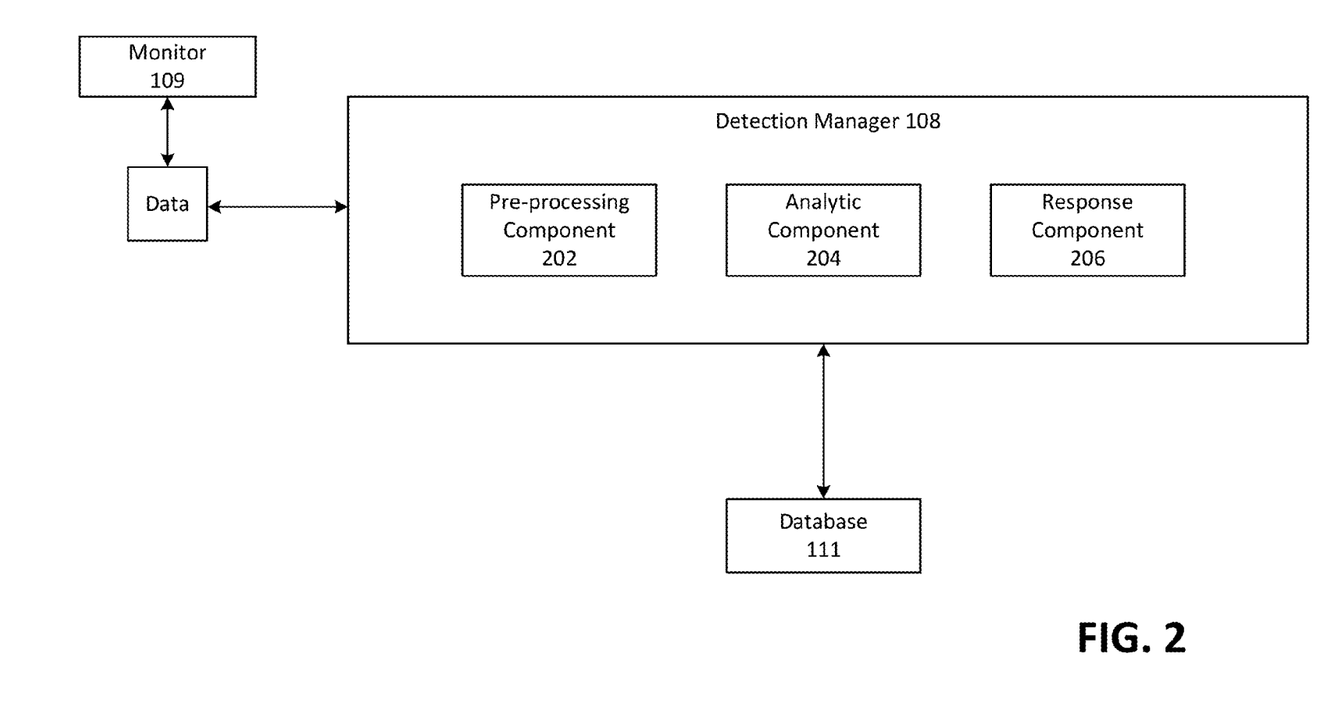
FIG. 2 depicts an example detection manager that may be a part of the web services platform of FIG. 1.
Figure 3:
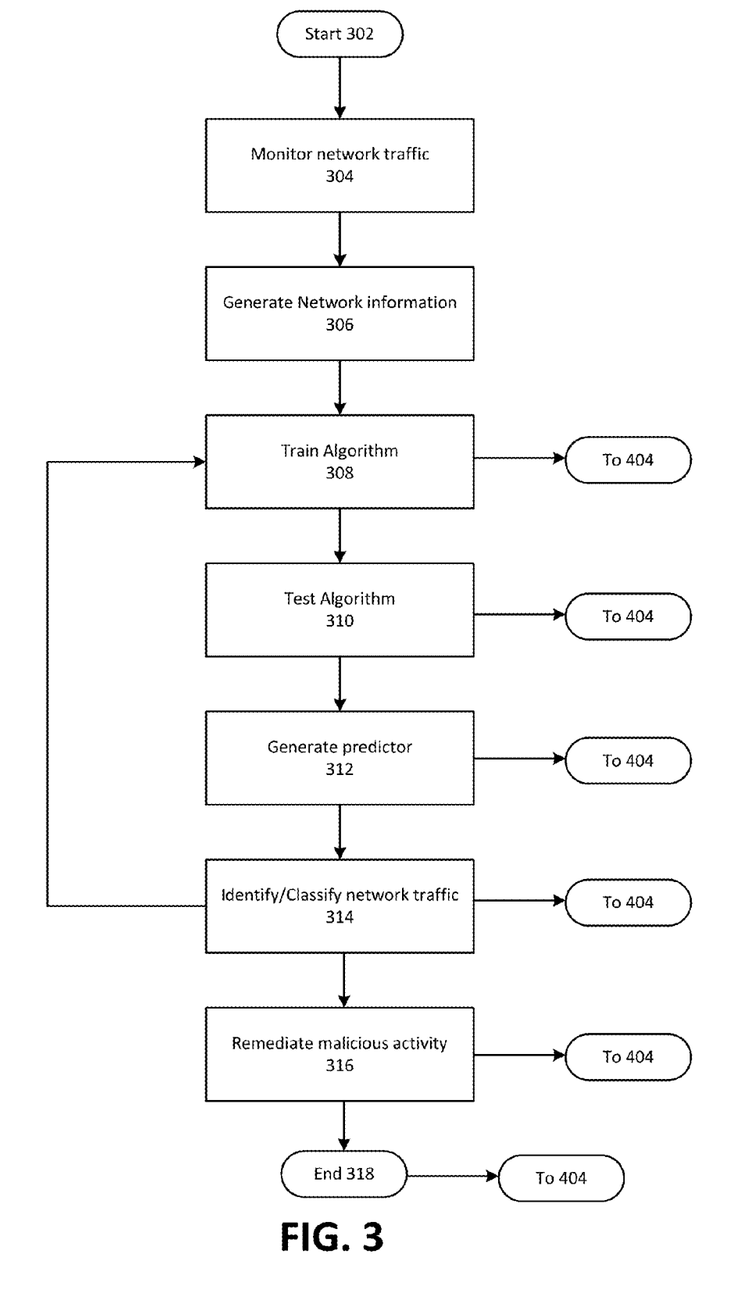
FIG. 3 depicts example operating procedures for identifying malicious activity in a network environment, such as the web services platform of FIG. 1, using a machine learning algorithm.
Figure 4:
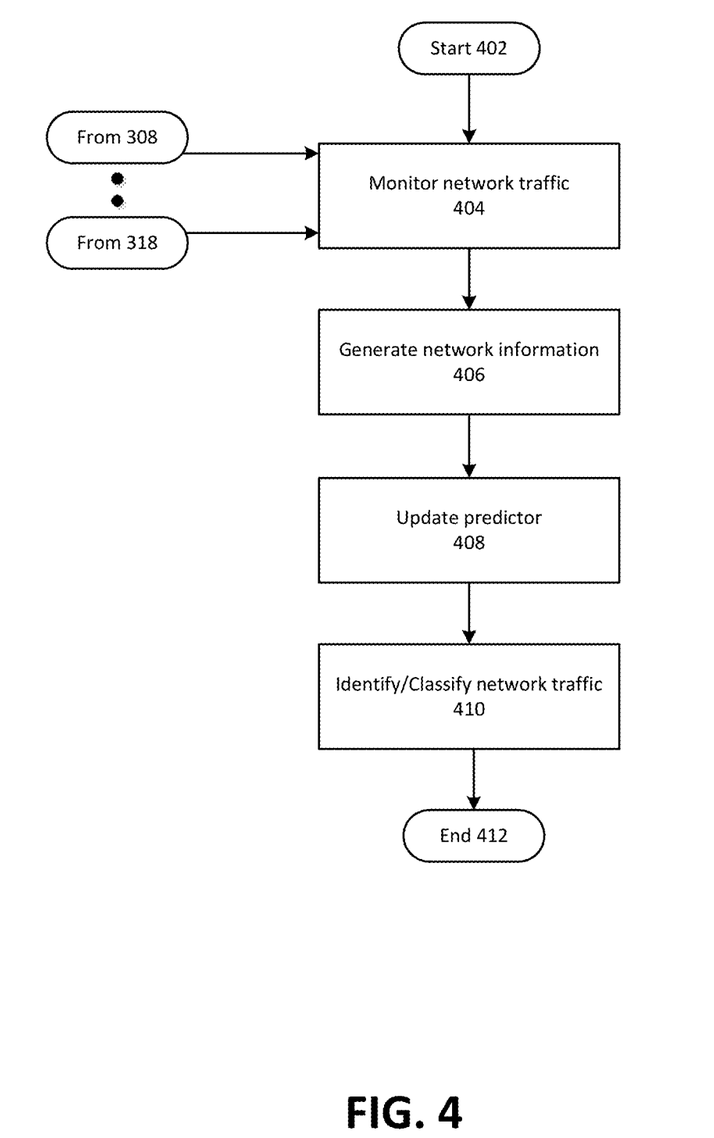
FIG. 4 depicts example operating procedures for identifying malicious activity in a network environment, such as the web services platform of FIG. 1, using a machine learning algorithm.
Figure 5:
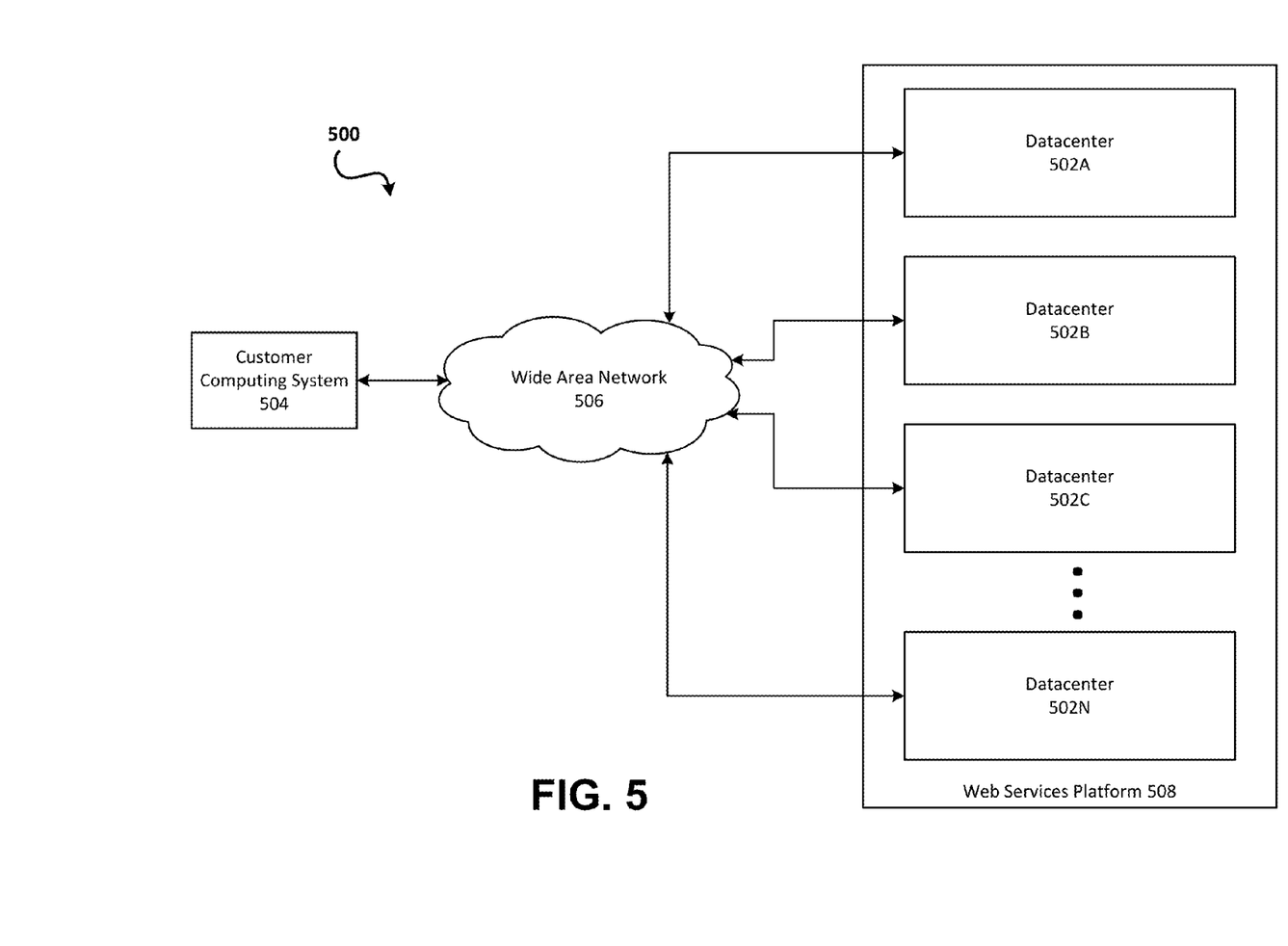
FIG. 5 depicts a web services platform, such as in FIG. 1, that comprises a plurality of datacenters.
Figure 6:
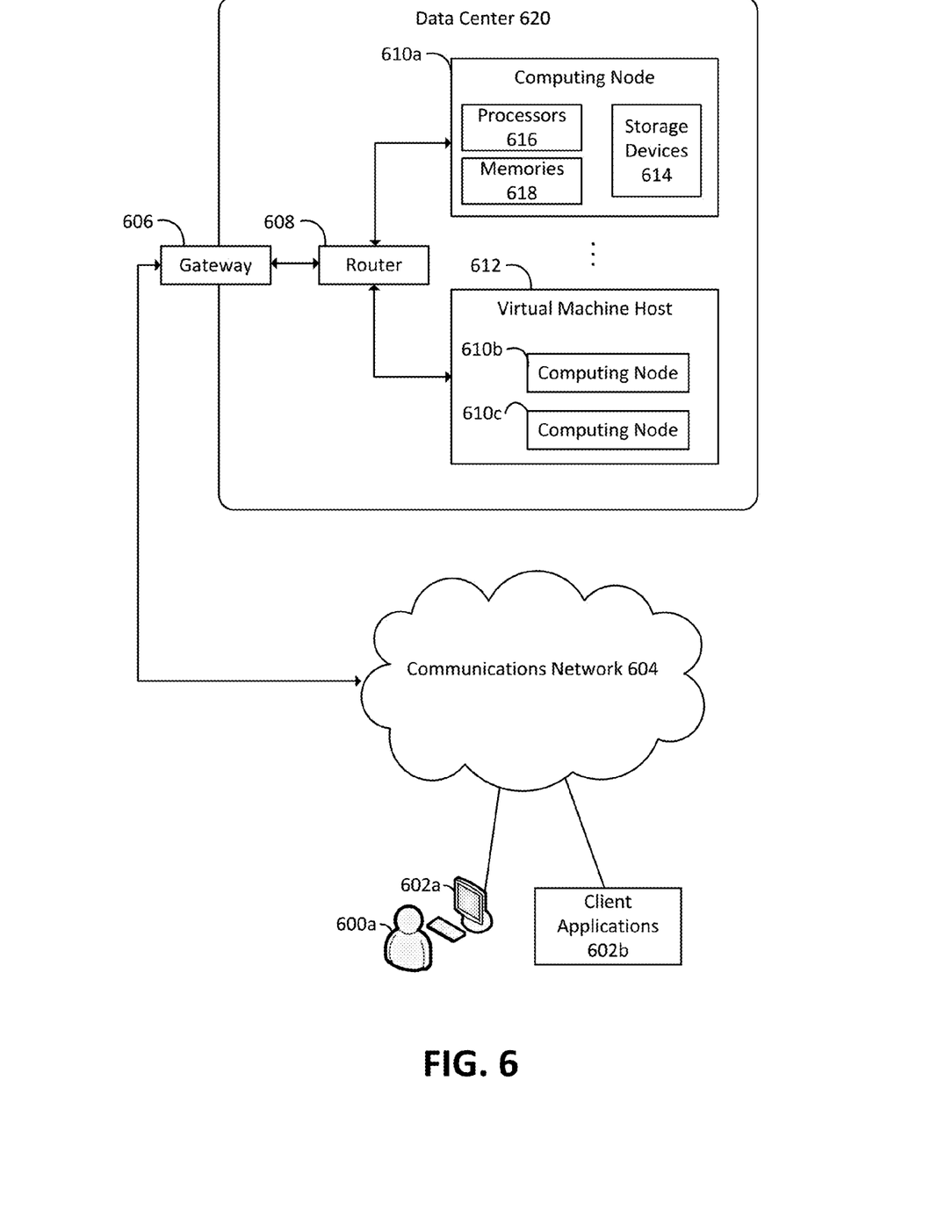
FIG. 6 depicts a datacenter, such as in FIG. 5.
Figure 7:
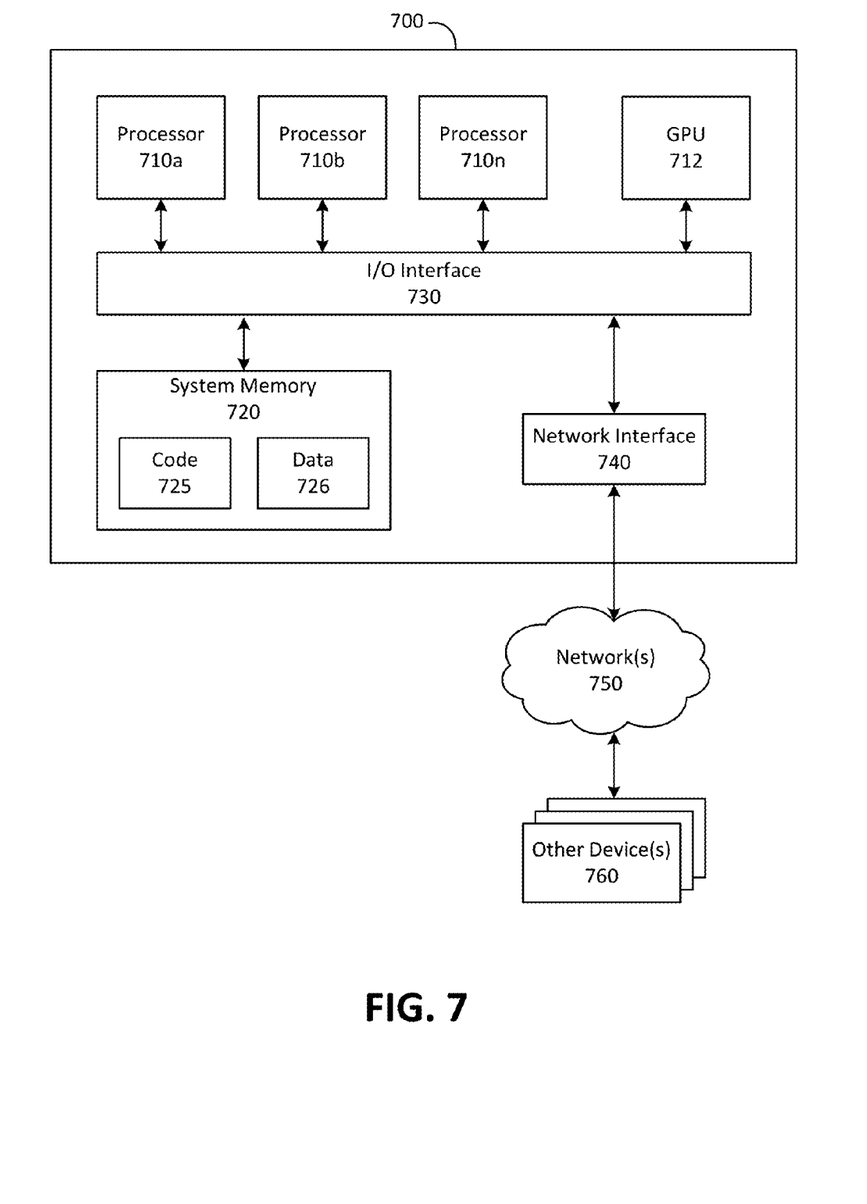
FIG. 7 depicts a computer that may be part of a datacenter, such as in FIG. 5.

Turning now to the figures, they begin with example environments in which these techniques may be implemented (FIGS. 1-2). Then, they move to example operating procedures that may be implemented to perform some of these techniques (FIGS. 3-4). And they conclude with further detail of example environments in which these techniques may be implemented (FIGS. 5-7). In an aspect, one or more computing nodes (e.g., physical hosts, virtual instances, applications executing via physical or virtual components, etc.) may be monitored to retrieve coarse data such as network traffic counters data. Such coarse data may be pre-processed to refine the coarse data by selecting a portion of the coarse data. Such pre-processing may include identifying and selecting certain patterns or statistics relating to the data, identifying a source of the data, grouping the data, aggregating the data, and/or applying pre-processing algorithms to the data. Pre-processing may include validating the data, for example, based on contextual information such as IP reputation, account status, risk score, and the like. A machine learning algorithm may be trained and tested on a selection of data (e.g., coarse data, pre-processed data) to generate a predictor. The predictor may comprise one or more fingerprints representing particular patterns in the data or statistics relating to the data. The predictor may be used as a comparator against other data such as network traffic to identify and/or classify patterns in the other data. The identification and/or classification may be validated based on contextual information such as IP reputation, account status, risk score, and the like. Based on the identification and/or classification, remediation measure may be implemented.

FIG. 1 depicts an example operating environment in which aspects may be implemented. In aspects, web services platform 150 may communicate with customer computer 102 via Internet 104. Web services platform 150 may provide computing services to customer computer 102 by executing at least one virtual machine (VM) instances on a computer of computer rack A 106A or computer rack B 106B, under the direction of customer computer 102. Such computing services may comprise a compute cloud service, a cloud storage service, a relational database service, a NoSQL database service, a non-relational data storage service, a workflow service, a queue service, a notification service, and/or a content delivery service, for example. Web services platform 150 may also serve web pages to customer computer 102 from web server 112, or store data for customer computer 102 in object-level storage 114. In aspects, object-level storage 114 may store data as objects (e.g., files). It may be appreciated that there are aspects where a block-level storage service is implemented instead of, or in addition to, storage 114. As The components of web services platform 150—computer rack A 106A, computer rack B 106B, node manager 107, detection manager 108, web server 112, and object-level storage 114—may be connected to each other via intranet 120. The node manager 107 may be configured to manage the configuration (e.g., initialization, start-up, recovery, registration, removal, monitoring, etc.) of at least one computing node such as computer racks 106A, 106B, virtual machine instances 116 (depicted here as VM instance 116A and VM instance 116B), or network services. The detection manager 108 may be integrated with the node manager 107 or may be a distinct component. Intranet 120 may comprise networking equipment such as switches, routers, firewalls, and load balancers. Computer rack A 106A and computer rack B 106B are physical racks configured to hold at least one physical computers, such as physical host computer 118. In turn, each physical host computer is configured to execute at least one virtual machine instances 116 and a host partition 110. These VM instances may execute on behalf of customer computer 102 (or another entity) to provide compute services to customer computer 102.

In an aspect, the detection manager 108 may be in communication with one or more computing nodes and/or communication links between two or more computing nodes. The detection manager 108 may be configured to receive or access information relating to the one or more computing nodes. The detection manager 108 may be configured to receive a data dump of information and/or may be configured to process the received or accessed data to filter at least a portion of the received or accessed data. The detection manager 108 may be configured to analyze the received data, for example, using a machine learning algorithm to identify the data as representative of malicious activity. The detection manager may use a machine learning algorithm to classify the data as a particular type of malicious activity (e.g., ingress DoS, egress DoS, botnet command and control (C&C) services, unauthorized network scans and probes, phishing, spamming, etc.) The machine learning algorithm may be trained and tested on a selection of data (e.g., coarse data, pre-processed data) to generate a predictor. The predictor may comprise one or more fingerprints representing particular patterns in the data or statistics relating to the data. The predictor may be used as a comparator against other data such as network traffic to identify and/or classify patterns in the other data. The identification and/or classification may be validated based on contextual information such as IP reputation, account status, risk score, and the like. Based on the identification and/or classification, the detection manager 108 may also be configured to implement remediation actions, for example, alone or in concert with the detection manager 108.

In an aspect, one or more monitors 109 (e.g., sensors, devices, services, processes, recorders, logging components, etc.) may be in communication with one or more computing nodes and/or communication links between two or more computing nodes. The one or more monitors 109 may be configured to receive or access information relating to the one or more computing nodes. The one or more monitors 109 may be configured to receive a data dump of information and/or may be configured to process the received or accessed data to filter at least a portion of the received or accessed data. The one or more monitors 109 may also be configured to implement remediation actions, for example, alone or in concert with the detection manager 108. The one or more monitors 109 may be disposed locally to the one or more computing nodes or remotely therefrom. As an example, the detection manager 108 may aggregate data received from the one or more monitors 109. Such aggregation may include contextual information such as service policies, historical data, and source of the data, for example.

In an aspect, a database 111 may be in communication with one or more of the detection manger 107, the one or more monitors 109, and computing nodes. The database 111 may be configured to store information received or accessed from the one or more monitors 109 and/or the detection manager 108, for example. The database 111 may be configured to store one or more predictors generated by the detection manager 108 or other component. As an example, one or more fingerprints representing a pattern of network traffic of computing node operation may be stored in the database 111 as a library that may be accessed by various local and/or remote components. Other information may be stored in the database 111.

As depicted, web services platform 150 is divided into two logical components—web services network 160 and production network 170. In turn, as depicted, web services network 160 generally comprises a portion of web services platform 150 that offers compute services to users. In turn, production network 170 as depicted comprises web server 112 and object-level storage 114, and may generally host a web site for web services platform 150.

Web services network 160 and production network 170 may be considered to be separate intranets within web services platform 150, where communications between the two intranets is generally restricted relative to communications within an intranet. For example, each intranet may host a computer that has the same Internet Protocol (IP) address, and so addressing communications between these two computers would involve some degree of Network Address Translation (NAT) that may not be involved in communications between two computers solely within production network 170.

FIG. 2 depicts an example operating environment in which aspects may be implemented. As shown, FIG. 2 depicts an example detection module 108. The detection module may comprise a pre-processing component 202, an analytic component 204, and a response component 206. Other components may be include and may be distributed in various locations and implementations. The detection module 108 may be configured to receive data from various sources such as one or more computing nodes, the one or more monitors 109, and/or the database 111. In an aspect, the pre-processing component 202 may be configured to receive a data dump of information and/or may be configured to process the received or accessed data to filter at least a portion of the received or accessed data. Pre-processing may comprise filtering known benign activities, safe-list (whitelist) activities and senders, ignoring data that is insufficient, and the like from the data dump.

In an aspect, the analytic component 204 may be configured to access or receive data, for example, from the pre-processing component 202 or other datasource. The analytic component 204 may be configured to analyze the received data, for example, using a machine learning algorithm to identify the data as representative of malicious activity. The analytic component 204 may use a machine learning algorithm to classify the data as a particular type of malicious activity (e.g., ingress DoS, egress DoS, botnet C&C services, unauthorized network scans and probes, phishing, spamming, etc.) Machine learning algorithms may include linear logistic regression, k-means clustering, support vector machine (SVM), Bayesian belief networks, neural networks, decision tress, statistical classifier, clustering algorithms, and the like. Other algorithms may be used. Supervised learning as well as unsupervised learning techniques may be used to train the machine learning algorithm (e.g., model). The machine learning algorithm may be trained and tested on a selection of data (e.g., coarse data, pre-processed data) to generate a predictor. For example, the machine learning algorithm may be trained based on at least a first portion of the received data and may be tested based on at least a second portion of the received data. The predictor may comprise one or more fingerprints representing particular patterns in the data or statistics relating to the data. The predictor may be used as a comparator against other data such as network traffic to identify and/or classify patterns in the other data. As an example, the identification and/or classification may be validated based on contextual information such as IP reputation, account status, risk score, and the like.

Based on the identification and/or classification, the response component 206 may be configured to implement remediation actions. Remediation may comprise one or more of throttling the second network traffic, blocking the second network traffic, transmitting a notification, and generating an event ticket. Other remediation such as shut down of a computing node or disabling a network interface may be implemented. In an aspect, the response component 206 may implement remediation using other components such as the node manager 107.

FIG. 3 depicts example operating procedures for identifying an unauthorized device in a heterogeneous environment, such as the web services platform of FIG. 1. In some embodiments, the operating procedures of FIG. 3 may be implemented by node manager 107 and or detection manager 108 of FIG. 1 to analyze network traffic and operational parameters of one or more computing nodes to identify malicious activity.

It may be appreciated that there are embodiments that do not implement all of the operating procedures depicted in FIG. 3, or implement the depicted operating procedures in a different order than is depicted. The operating procedures of FIG. 3 begin with operation 302 and move to operation 304. Operation 304 depicts monitoring first network traffic. Monitoring may comprise receive or access information relating to a network comprising one or more computing nodes. In an aspect, the first network traffic may comprise communication between two or more computing nodes. As an example, the first network traffic may comprise operational parameters of one or more computing nodes. As a further example, the first network traffic may comprise web browsing, email, VoIP, streaming video, application layer to database communication, database server to storage fabric communication, a slowloris attack, a SYN flood, a user datagram protocol (UDP) flood, scanning of ports on a host, scanning of a port or ports across hosts, an LDoS, and the like.

Operation 306 depicts generating network information (e.g., statistics, features, etc.) based on the monitored first network traffic. In an aspect, network information may comprise various parameters, patterns, signatures, and/or fingerprints representing at least a feature of the first network traffic. As an example, network information may comprise at least one of average packet size, average time gap between packets, a ratio of inbound to outbound packets, TCP flag ratio, flag count, number of source/destination ports, ratio of inbound to outbound bytes, and type of protocol used.

Operation 308 depicts training a machine learning algorithm based on at least a first portion of the generated network information. Machine learning algorithms may include Bayesian belief networks, artificial neural networks, decision tress, statistical classifier, supervised learning, unsupervised learning, clustering algorithms, and the like. Operation 310 depicts testing the machine learning algorithm based on at least a second portion of the generated network information.

Operation 312 depicts generating a predictor using the trained and tested machine learning algorithm. The predictor may comprise one or more fingerprints representing particular patterns in the network information. Such patterns may be indicative of malicious activity (e.g., ingress DoS, egress DoS, Botnet command and control services, unauthorized network scans and probes, phishing, spamming, etc.). The predictor may be used as a comparator against other data such as network traffic to identify and/or classify patterns in the other data. As an example, the identification and/or classification may be validated based on contextual information such as IP reputation, account status, AMI risk score, and the like.

Operation 314 depicts identifying and/or classifying second network traffic. In an aspect, the second network traffic can be identified as one or more of malicious activity and benign activity using the predictor. Other identifications may be made. In an aspect, the second network traffic may comprise web browsing, email, VoIP, streaming video, application layer to database communication, database server to storage fabric communication, a slowloris attack, a SYN flood, a UDP flood, scanning of ports on a host, scanning of a port or ports across hosts, an LDoS, and the like. In another aspect, identifying second network traffic as malicious activity may comprise classifying the second network traffic as a particular type of activity. For example, network traffic patterns matching a predictor associated with a predetermined activity may be classified as representing the same or similar activity. As a further example, a collection (e.g., library) of predetermined fingerprints relating to various predetermined activates may be generated and accessed to identify and/or classify network traffic. The trained and tested machine learning algorithm may be updated. As an example, the operational procedure may return to operation 308 for further training and testing. As another example, when the identification and/or classification of activity is validated (e.g., confirmed as accurate), such validation information may be used to update the algorithm. As a further example, when network traffic is found to be misidentified and/or misclassified, such knowledge may be used to update the algorithm.

Operation 316 depicts remediating the malicious activity. In an aspect, remediating comprises one or more of throttling the second network traffic, blocking the second network traffic, transmitting a notification, disabling one or more computing nodes or network interfaces, and generating a workflow ticket. Other remediation measure may be implemented based at least in part on the identified malicious activity. The operating procedure of FIG. 3 may end at 318. However, at any operation (e.g., operation 308-318), the operating procedure of FIG. 3 may continue to the operating procedure of FIG. 4

FIG. 4 depicts example operating procedures for identifying an unauthorized device in a heterogeneous environment, such as the web services platform of FIG. 1. In some embodiments, the operating procedures of FIG. 4 may be implemented by node manager 107 and or detection manager 108 of FIG. 1 to analyze network traffic and operational parameters of one or more computing nodes to identify malicious activity.

It may be appreciated that there are embodiments that do not implement all of the operating procedures depicted in FIG. 4, or implement the depicted operating procedures in a different order than is depicted. The operating procedures of FIG. 4 begin with operation 402 and move to operation 404. Operation 404 may follow operations 308-318 of FIG. 3. Operation 404 depicts monitoring third network traffic. Monitoring may comprise receive or access information relating to a network comprising one or more computing nodes. In an aspect, the third network traffic may comprise communication between two or more computing nodes. As an example, the third network traffic may comprise operational parameters of one or more computing nodes. As a further example, the third network traffic may comprise web browsing, email, VoIP, streaming video, application layer to database communication, database server to storage fabric communication, a slowloris attack, a SYN flood, a UDP flood, scanning of ports on a host, scanning of a port or ports across hosts, an LDoS, and the like.

Operation 406 depicts generating second network information (e.g., statistics, features, etc.) based on the monitored first network traffic. In an aspect, the second network information may comprise various parameters, patterns, signatures, and/or fingerprints representing at least a feature of the first network traffic. As an example, the second network information may comprise at least one of average packet size, average time gap between packets, a ratio of inbound to outbound packets, TCP flag ratio, flag count, number of source/destination ports, ratio of inbound to outbound bytes, and type of protocol used.

Operation 408 depicts updating the predictor using second network information. In an aspect, a machine learning algorithm used to generate the predictor may be trained and/or tested based on the second network information. As such, the updated machine learning algorithm may generate an updated predictor (e.g., modified predictor, new predictor, second predictor, etc.). Such a continuous training may be used to maintain an up-to-date library of predictors representing changing network patterns and new malicious activities that need to be classified.

Operation 410 depicts identifying and/or classifying fourth network traffic. In an aspect, the fourth network traffic may be identified and/or classified using the updated predictor. In an aspect, the fourth network traffic may comprise web browsing, email, VoIP, streaming video, application layer to database communication, database server to storage fabric communication, a slowloris attack, a SYN flood, a UDP flood, scanning of ports on a host, scanning of a port or ports across hosts, an LDoS, and the like. In another aspect, identifying the fourth network traffic as malicious activity may comprise classifying the fourth network traffic as a particular activity. For example, network traffic patterns matching a predictor associated with a predetermined activity may be classified as representing the same or similar activity. As a further example, a library of predetermined fingerprints relating to various predetermined activates may be generated and accessed to identify and/or classify network traffic. The operating procedure of FIG. 4 may end at 412.

FIGS. 5-7 are similar to FIG. 1 in that they depict example operating environments in which aspects disclosed herein may be implemented, and said figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter. Any of the devices, computers, servers, and/or instance may be considered computing nodes, as used herein.

It may be appreciated that the operating environments of FIGS. 5-7 may be used to implement aspects of the operating environment of FIG. 1. For example, web services platform 150 and its components may be implemented in web services platform 508 of FIG. 5. Likewise, Internet 104 of FIG. 1 may be wide area network 506 of FIG. 5, physical host computer 106, node manager 107, detection manager 108, web server 112, and object-level storage 114 may each be customer computing system 504 of FIG. 5 and/or computing device 700 of FIG. 7.

Turning now to details of FIG. 5, this figure depicts an example of a suitable computing environment in which aspects described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508 for implementing virtual clouds and for providing on-demand access to compute resources, such as virtual machine instances. Web services platform 508 may provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 508 may be enabled by at least one datacenters 502A-502N, which may be referred herein singularly as "datacenter 502" or in the plural as "datacenters 502." Datacenters 502 may be facilities that house and operate computer systems and associated components and may include redundant and backup power, communications, cooling, and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 5.

Entities of web services platform 508 may access the compute resources (e.g., computing nodes) provided by datacenters 502 over a wide area network (WAN) 506. Although a WAN is illustrated in FIG. 5, it should be appreciated that a local area network (LAN), the Internet, or any other networking topology known in the art that connects datacenters 502 to remote entities and other users may be utilized. It should also be appreciated that combinations of such networks may also be utilized.

An entity or other entities that are customers of web services platform 508 may utilize a customer computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box, or any other computing node.

As is described in greater detail below, customer computing system 504 may be utilized to configure aspects of the compute resources provided by web services platform 508. In this regard, web services platform 508 may provide a web interface through which aspects of its operation may be configured through the use of a web browser application program executing on customer computing system 504. Alternatively, a stand-alone application program executing on customer computing system 504 may access an application programming interface (API) (not shown) exposed by web services platform 508 for performing the configuration operations. Other mechanisms for configuring the operation of web services platform 508, including launching new virtual machine instances on web services platform 508, may also be utilized.

According to aspects disclosed herein, capacities of purchased compute resources provided by web services platform 508 may be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 508 may also be configured with a deployment component to assist entities in the deployment of new instances of compute resources. The deployment component may receive a configuration from an entity that may include data describing how new instances should be configured. For example, the configuration may specify at least one applications or software components that should be installed in new instances provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c (e.g., computing nodes) within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620 (which may be similar in data center 502), may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618, or storage devices 614.

Computing nodes 610b and 610c are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. The computing nodes can be or comprise computing nodes. Computing nodes may be services or compute processes executing via one or more computing nodes. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

In at least some embodiments, a server that implements a portion or all of one or more of the technologies described herein may include a general-purpose computer system that includes or is configured to access one or more computer-accessible media.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for classifying malicious activity in a web services platform using machine learning techniques, the method comprising:
monitoring, by one or more computing nodes, first network traffic having a first communication type;
generating, by the one or more computing nodes, network statistics based on the monitored first network traffic;
training, by the one or more computing nodes, a machine learning algorithm based on at least a first portion of the generated network statistics;
testing, by the one or more computing nodes, the machine learning algorithm based on at least a second portion of the generated network statistics;
generating, by the one or more computing nodes, a predictor using the trained and tested machine learning algorithm
classifying the predictor based at least on the communication type of the first network traffic;
identifying second network traffic as having the same communication type as the first communication type of the first network traffic;
identifying, by the one or more computing nodes, the second network traffic as malicious activity using the predictor;
classifying, by the one or more computing nodes, the malicious activity using the predictor; and
remediating, by the one or more computing nodes, the malicious activity.

2. The method of claim 1, wherein the network statistics comprise at least one of average packet size, average time gap between packets, a ratio of inbound to outbound packets, transmission control protocol (TCP) flag ratio, flag count, number of source/destination ports, ratio of inbound to outbound bytes, and type of protocol used.

3. The method of claim 1, wherein remediating comprises one or more of throttling the second network traffic, blocking the second network traffic, transmitting a notification, generating an event ticket, disabling a network interface, and shutting down one or more computing nodes.

4. The method of claim 1, further comprising:
monitoring, by the one or more computing nodes, third network traffic;
generating, by the one or more computing nodes, second network statistics representing the monitored third network traffic;
updating, by the one or more computing nodes, the predictor using second network statistics;
classifying, by the one or more computing nodes, fourth network traffic as malicious activity using the updated predictor.

5. A system for identifying activity in a network, the system comprising:
one or more computing nodes; and
at least one memory bearing instructions that, upon execution by the one or more computing nodes, cause the system at least to:
monitor first network traffic having a first communication type;
generate network information based on the monitored first network traffic;
train a machine learning algorithm based on at least a first portion of the generated network information;
test the machine learning algorithm based on at least a second portion of the generated network information;

generate a predictor using the trained and tested machine learning algorithm;
classify the predictor based at least on the communication type of the first network traffic;
identify second network traffic as having the same communication type as the first communication type of the first network traffic; and
identify at least a portion of the second network traffic as malicious activity or benign activity using the predictor.

6. The system of claim 5, wherein the network information comprises at least one of average packet size, average time gap between packets, a ratio of inbound to outbound packets, TCP flag ratio, flag count, number of source/destination ports, ratio of inbound to outbound bytes, and type of protocol used.

7. The system of claim 5, wherein the communication type of the first network traffic comprises one or more of web browsing, email, VoIP, streaming video, application layer to database communication, and database server to storage fabric communication.

8. The system of claim 5, further comprising at least one memory bearing instructions that, upon execution by the one or more computing nodes, cause the system at least to classify the identified malicious activity or benign activity.

9. The system of claim 8, wherein the identified malicious activity or benign activity is classified as one or more of a plurality predetermined activities.

10. The system of claim 5, further comprising at least one memory bearing instructions that, upon execution by the one or more computing nodes, cause the system at least to remediate the identified malicious activity.

11. The system of claim 10, wherein remediating comprises one or more of throttling the second network traffic, blocking the second network traffic, transmitting a notification, generating an event ticket, disabling a network interface, and shutting down one or more computing nodes.

12. The system of claim 5, wherein the predictor comprises one or more fingerprints and wherein identifying second network traffic as malicious activity or benign activity using the predictor comprises comparing one or more of at least a portion of the second network traffic and a network statistic of the second network traffic to the one or more fingerprints of the predictor.

13. A non-transitory computer-readable storage medium having stored thereon instructions that, upon execution by one or more computing nodes, cause the one or more computing nodes at least to:
monitor first network traffic having a first communication type;
generate network information based on the monitored first network traffic;
train a machine learning algorithm based on at least a first portion of the generated network information;
test the machine learning algorithm based on at least a second portion of the generated network information;
generate a predictor using the trained and tested machine learning algorithm;
classify the predictor based at least on the communication type of the first network traffic;
identify second network traffic as having the same communication type as the first communication type of the first network traffic; and
classify at least a portion of second network traffic using the predictor.

14. The non-transitory computer-readable storage medium of claim 13, wherein the network information comprises at least one of average packet size, average time gap between packets, a ratio of inbound to outbound packets, TCP flag ratio, flag count, number of source/destination ports, ratio of inbound to outbound bytes, and type of protocol used.

15. The non-transitory computer-readable storage medium of claim 13, wherein the communication type of the first network traffic comprises one or more of web browsing, email, VoIP, streaming video, application layer to database communication, and database server to storage fabric communication.

16. The non-transitory computer-readable storage medium of claim 13, further comprising instructions that, upon execution by the one or more computing nodes, cause the one or more computing nodes at least to identify the at least a portion of second network traffic as malicious activity or benign activity.

17. The non-transitory computer-readable storage medium of claim 16, further comprising instructions that, upon execution by the one or more computing nodes, cause the one or more computing nodes at least to remediate the classified malicious activity.

18. The non-transitory computer-readable storage medium of claim 17, wherein remediating comprises one or more of throttling the second network traffic, blocking the second network traffic, transmitting a notification, generating an event ticket, disabling a network interface, and shutting down on or more computing nodes.

19. The non-transitory computer-readable storage medium of claim 13, wherein the predictor comprises one or more fingerprints and wherein classifying the at least a portion of the second network traffic using the predictor comprises comparing one or more of the at least a portion of the second network traffic and a network statistic of the second network traffic to the one or more fingerprints of the predictor.

20. The non-transitory computer-readable storage medium of claim 13, further comprising instructions that, upon execution by the one or more computing nodes, cause the one or more computing nodes at least to generate a second predictor by at least training the machine learning algorithm based on information relating to third network traffic.

* * * * *